United States Patent [19]

Gorodissky et al.

[11] 4,214,758
[45] Jul. 29, 1980

[54] FACE SEALER DEVICE FOR ROLLER LOCK GATES

[76] Inventors: Leonid G. Gorodissky, Dmitrovskoe shosse, 153/43, kv. 106, Moscow, U.S.S.R.; Nikolai T. Romanov, deceased, late of Moscow, U.S.S.R.; by Anastasia I. Romanova, administrator, Bulatnikovsky proezd, 14, korpus 5, kv. 152, Moscow, U.S.S.R.

[21] Appl. No.: 19,662

[22] Filed: Mar. 12, 1979

[51] Int. Cl.² .......................... F16J 15/40; F16J 15/54
[52] U.S. Cl. ................................. 277/12; 277/DIG. 7;
68/5 E; 34/23; 34/242
[58] Field of Search ......... 277/15, 12, 237 R, DIG. 7;
34/23, 242; 68/5 E

[56] References Cited

U.S. PATENT DOCUMENTS

| | | | |
|---|---|---|---|
| 3,367,151 | 2/1968 | Fujihashi | 68/5 E |
| 4,142,854 | 3/1979 | Sando et al. | 68/5 E X |
| 4,148,493 | 4/1979 | Gorodissky et al. | 277/12 |

FOREIGN PATENT DOCUMENTS

| | | | |
|---|---|---|---|
| 1396300 | 3/1965 | France | 277/DIG. 7 |
| 1055040 | 1/1967 | United Kingdom | 68/5 E |

*Primary Examiner*—Robert S. Ward, Jr.
*Attorney, Agent, or Firm*—Steinberg & Blake

[57] ABSTRACT

The flat sealing member of the device is forced against the end face of the mutually rotatable rollers by virtue of a bow-shaped projection having a triangular cross section and somewhat rounded off crest to provide a relatively linear contact. The above flat sealing member has a hollow interior space for a refrigerant and a lubricant to feed thereinto, both of them being then delivered to the zone of contact of the above projection and the end faces of the rollers. Such a system reduces wear on the rubber-coated roller surface and adds to the service durability of the whole unit.

3 Claims, 4 Drawing Figures

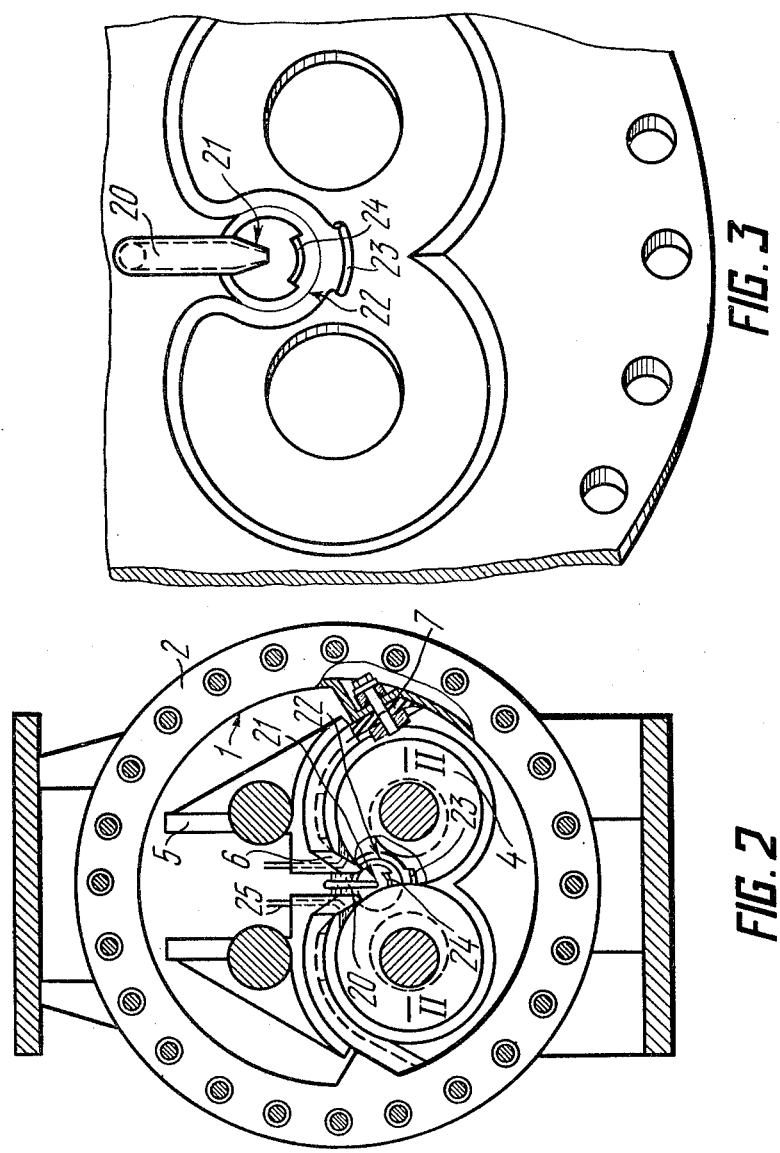

FACE SEALER DEVICE FOR ROLLER LOCK GATES

FIELD OF THE INVENTION

The present invention relates generally to sealing devices and more specifically to roller lock gates of a chamber for processing bandlike material under excess pressure.

The invention finds its greatest utility when applied in dyeing-and-finishing practice involved in the textile industry, viz., in chambers for fabric processing at elevated temperatures in a steam or water medium.

DESCRIPTION OF THE PRIOR ART

Known in the present state of the art are roller lock gates of a chamber for processing bandlike materials under excess pressure, said roller lock gates featuring a flat circular projection or collar located at the place of sealing of the roller faces, said projection being adapted to contact the flat end faces of the rollers, and a sealing space confined between said roller end faces (cf. U.S.S.R. Author's Certificates No. 334, 302 and No. 311, Cl. Л 06c; U.S. Pat. No. 3,546,902, Cl. 68-5).

The face sealers of said lock gates also feature a large area of friction within the zone of contact of their sealing members and requires extremely fine adjustment thereof, as any inaccuracy in their adjustment adversely affects the hermetic sealing of the lock gate or results in badly overheated rubber coating of the rollers and its premature failure.

Moreover, rubber coating of rollers in said known prior-art flat face sealers is liable to be overloaded at the places where it gets warped during contacting of the rollers, since rubber at that places should extend beyond the plane of roller faces, while flat face sealers tamper therewith.

OBJECTS OF THE INVENTION

It is an object of the present invention to provide a face sealing arrangement capable of preventing the overloading of rubber-coated rollers at the place of their mutual contact and define a substantially large-area field of friction.

It is another object of the present invention to provide for a prolonged service durability and operational reliability of roller lock gates.

It is still another object of the present invention to provide a constructionally simple and operationally inexpensive improved sealing arrangement of the character set forth hereinbefore.

SUMMARY OF THE INVENTION

To accomplish the above and other objects proposed herein, according to the present invention a face sealer device for a roller lock gate is made use of in pressure systems, featuring rubber-coated rollers arranged parallel to each other and adapted to contact each other, a regulator of the mutual axial position of the rollers for bringing the end faces thereof in the same plane, a flat sealing member forced against said end face of the rollers, linear sealers arranged along the generatrix of the rollers, a sealer arrangement for the roller journals, a cooling and lubricating system for the zone of contact between the rollers and said flat sealing member. The face sealer device of the invention is characterized in that said flat sealing member is essentially a hollow membrane provided with an inlet connection for the refrigerant and lubricant to feed in, a plurality of outlet holes for the fluid to deliver from said hollow interior space of said membrane to the area around said zone of contact, and a number of holes for withdrawing said lubricant, whereas the contact portion proper of the sealing member is made as a bow-shaped projection running from one face of the linear sealer to the other face thereof while rounding the zone of contact of the rollers, said projection having a triangular cross section and a sharp crest which provides for a relatively linear contact between the sealing member and the end faces of the rollers.

Such constructional arrangement enables one to minimize the area of the field of friction owing to the provision of a linear zone of contact, thereby reducing the amount of heat evolved due to friction which is deleterious to the rubber coating, to ensure best heat abstraction conditions in the zone of friction and reliable lubrication of the rubbing surfaces.

According to an embodiment of the present invention a face sealer device for a roller lock gate is proposed characterized in that the crest of said triangular projection is somewhat rounded off.

Such constructional arrangement enables lubricant to be saved due to precluding its losses on the surfaces of parts removed from the zone of friction. In addition, the feeding of lubricant through the slot opening completely obviates any possibility of non-lubricated surfaces, thus adding to the operational reliability of the device as a whole.

According to another embodiment of the present invention, the present invention provides a face sealer device for a roller lock gate, characterized in that a slot opening is provided in the wall of the membrane on at least one side of the projection, for a directional feed of lubricant and refrigerant onto the side of the triangular projection.

The above embodiment of the invention affords an additional opportunity to provide a directional feed of lubricant, thus reducing the consumption thereof, and also to surely prevent some individual portions of the zone of rubbing surfaces from drying off.

BRIEF DESCRIPTION OF THE DRAWINGS

In what follows the present invention is disclosed in detail in a specific practical embodiment thereof disclosed hereinbelow with reference to the accompanying drawings, wherein:

FIG. 2 is a cross section taken along the line II—II of FIG. 1;

FIG. 3 is a view of the sealing of the face sealer, taken along the arrowhead III of FIG. 1.

DETAILED DESCRIPTION

Figure 1:
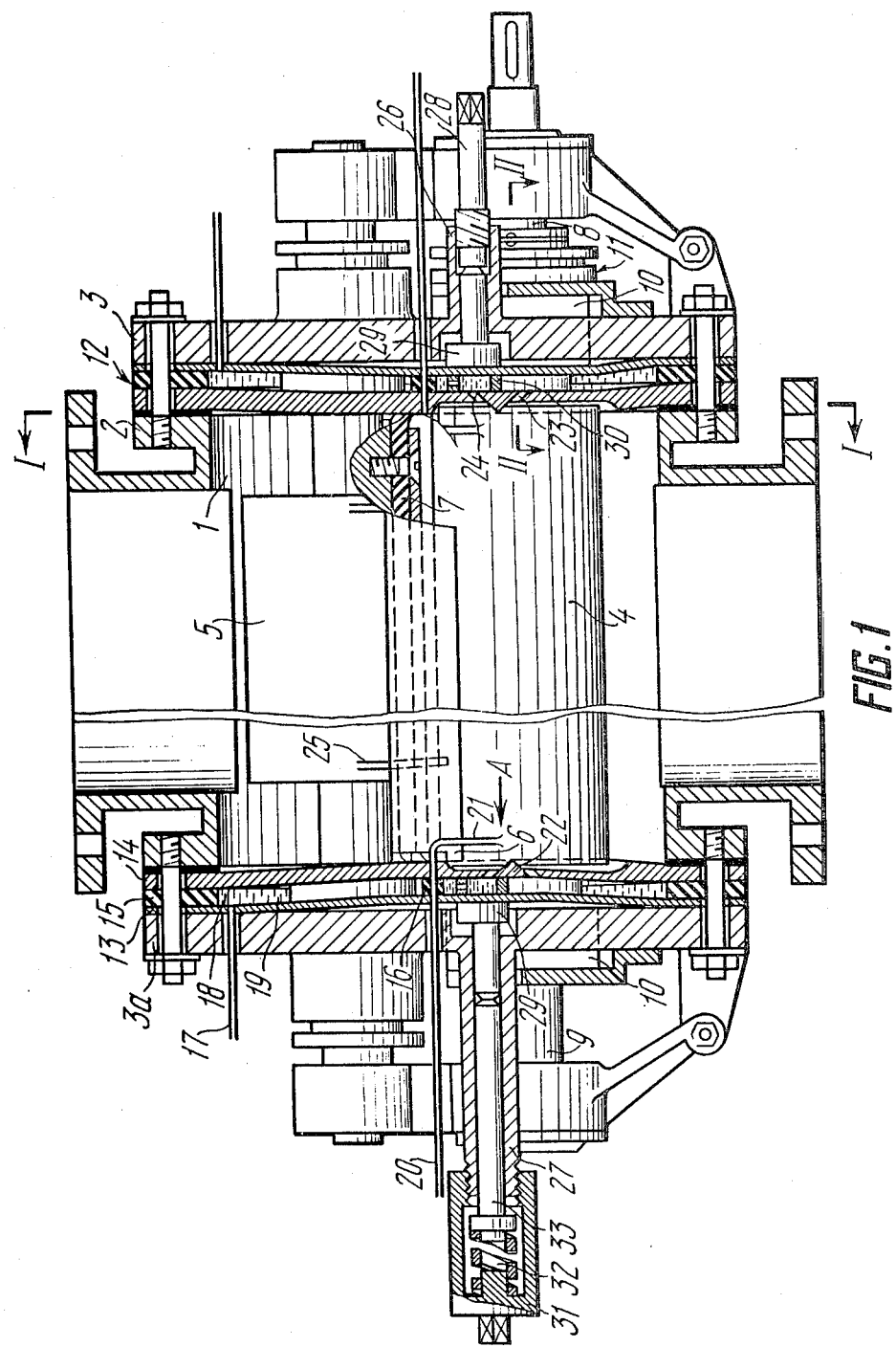
FIG. 1 is a schematic longitudinal-sectional view of a lock gate in an apparatus for a continuous fabric processing under excess pressure, according to the invention.

Reference being now directed to the accompanying drawings, FIG. 1 illustrates the lock gate of an apparatus for a continuous fabric processing under excess pressure to contain a housing 1 provided with a flange 2 at both ends thereof, each flange mounting a cover 3 (or 3a) of the lock gate housing. The housing accommodates a pair of rollers 4 and a pair of linear sealing members 5 (FIGS. 1 and 2). Projections 6 are provided on each of the faces of each sealing member 5 near the places of contact between the sealing members 5 and the cylindrical surface of the rollers 4. Each of the sealing members 5 is provided with a gasket 7 self-packing under the effect of excess pressure applied from below as illustrated in FIGS. 1 and 2. Said gasket 7 securely holds pressure effectively in the bottom portion of the housing 1, though offering no obstacles to the sealing member 5 to travel lengthwise of the housing 1 of the lock gate (FIG. 1). Each of the rollers 4 is provided with a driven journal 8 and a loosely rotating journal 9, each of said journals being hermetically sealed through the agency of any sealer arrangement 10 of revolving shafts suitable for the purpose. Each driven journal 8 has a device 11 for axially adjusting the position of the roller 4. Provided in between each of the flanges 2 and the cover 3 (or 3a) is a built-up pliable membrane 12, composed of a disk 13, a stainless-steel disk 14, a ring sealer 15 and sealing means 16 adapted for packing the components passed through the membranes. Each of the disks 13 tightly communicates with a duct 17. A space 18 is defined between the disk 13 and the disk 14 for a refrigerant and coolant 19 to be held in.

A tube 20 is tightly passed through the disks 13 and 14, while an end 21 of the tube 20 is located close to the joining faces of the rollers 4. Each of the disks 14 has a bow-shaped projection 22 (FIGS. 1,2,3) whose ends are in contact with the projections 6 of the sealing members 5. The bottom portion of the bow-shaped projection 22 can be arranged above the line A—A passing through the centres of the rollers 4 (FIG. 2), or below that line (not shown) close to the boundary line of the hermetically sealed contact between the rubber coatings of the rollers 4 pressed against each other. The projection 22 is finely polished and its crest is somewhat rounded off. Slit openings 23 and 24 (FIGS. 1,2,3) are made in the wall of the membrane 12 above and below the projection 22. Ducts 25 (FIGS. 1 and 2) are provided near the ends of each of the sealing members 5.

The cover 3 is provided with a cylindrical projection 26 internally threaded at one end, whereas the cover 3a has a cylindrical projection 27 externally threaded at one end. Pressure screw 28 is turned into the cylindrical projection 26, said screw being adapted to contact a pressure rod 29. A perforated collar 30 is provided in each space 18 coaxially with the pressure rod 29. A cylinder 31 is turned onto the cylindrical projection 27, said cylinder carrying a spring 32 adapted to contact a rod 33 whose vacant end in turn is in contact with the pressure rod 29. The device 11 for axially adjusting the position of the roller 4 comprises a bracket 34 held on the cover 3 and having two internally threaded annular projections 35 coaxial with the roller journals 8. Turned into each annular projection 35 is a threaded bush 36 having an inner flange 37 and an outer flange 38 provided with a slot 39 for a special wrench. Fitted over each of the trunnions 8 is a bushing 40 with a shoulder 41, while fitted onto the bushing 40 are a trust bearing 42 with one of its races contacting the shoulder 41 and with the other race, the inner flange 37, and a thrust bearing 43 which contacts the inner flange 37 on the other side thereof. Set on the bushing 40 is also a bushing 44 contacting the bearing 43. Both of the bushings 40 and 44 are fixed stationary on the journal 8 by, for example, a pin 45 which is locked in place by a circlip 46. Held to the annular projection 35 by a screw 47 is a retention pin 48 adapted to engage one of the slots 39 of the flange 38.

Figure 4:
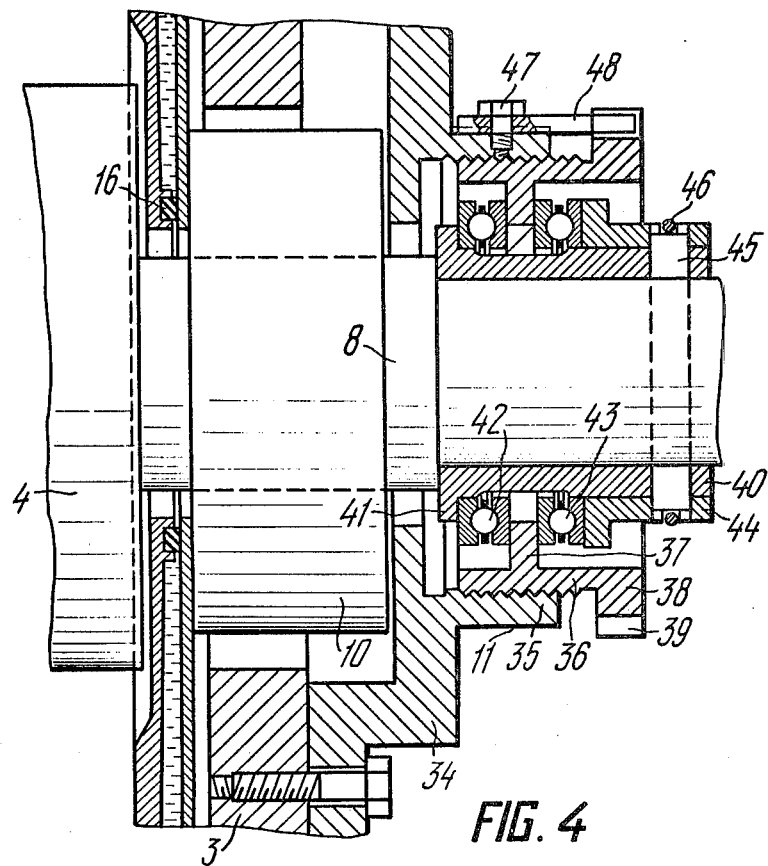
FIG. 4 is a schematic view of the mechanism for regulating the position of the end faces of the lock gate roller.

The sealing of the lock gate is carried out as follows. A gaseous fluid is pressure-fed under the rollers. As a result, the bevelled edges of the gasket 7 (FIGS. 1, 2) are forced against the walls of the housing 1 and the disks 14. It is due to the fact that the rollers 4 are pressed against each other and to the sealing members 5 that the housing 1 is hermetically sealed across the diameter thereof. The space confined between the sealing members 5 is sealed on the faces with the projections 6 tightly adjoining the disks 14 at the ends of the projections 22 which are pressed in into the rubber coating of the end faces of the rollers 4. As the lock gate operates its rubbing surfaces should be amply lubricated and cooled. To this end, the lubricant 19 (which is at the same time the refrigerant) is fed into each of the spaces 18 along the ducts 17; then the lubricant emerges from each of the spaces 18 along the ducts 23 and 24 to lubricate and cool each of the sealing projections 22. On the outside, each of the sealing projections of the inlet lock gate is lubricated by the lubricant fed along the ducts 25 of each of the sealing members 5 and running down the end faces of the rollers 4. Should it be necessary to keep the trunk of the rollers 4 of the inlet lock gate dry, the surplus lubricant is withdrawn through the tubes 20 whose ends 21 run immediately to the trunk of the rollers as can be seen from FIG. 2. The lubricant oozing through the duct 23 is to be removed through the condensate extractor (not shown) by resorting to any heretofore known methods. Reliable contact of the pliable membranes 12 is attained due to turning in the pressure screw 28 and the cylinder 31 which force the rods 29 against the disks 13 which, in turn, while acting through the perforated collars 30, press the disks 14 to the projections 6 of the sealing members 5. An inadequate thermal expansion does not affect the operation of the lock gate as the spring 32 enables the sealing members 5 to extend in excess of the housing 1. An airoperated system may be made use of to good advantage instead of the spring. If each pair of the end faces of rollers fails to lie in the same plane the end faces cannot be sealed. Thus, the axial position of the rollers is adjustable through the device 11 illustrated in FIG. 4. Whenever it is necessary to displace the roller to the left, one must turn in the threaded bush 36 which in this case actuates with its inner flange 37 the thrust bearing 42, the shoulder 41 and the journal 8, so that the roller 4 is displaced to the left.

When turning out the threaded bush 36 it actuates with its inner flange 37 the thrust bearing 43 which, in turn, acts through the bushing 44 and the pin 45 upon the journal 8, so that the roller 4 is displaced to the right.

What is claimed is:

1. A face sealer device for a roller lock gate made use of in pressure systems, featuring rubber-coated rollers arranged parallel to each other, provided with bearing journals and adapted for contacting each other; a means for regulating the mutual position of said rollers when bringing the end faces thereof in the same plane; linear sealers forced to each of the rollers along the generatrix thereof; a means for sealing the bearing journals of the rollers; a flat sealing member forced against said common face surface of the rollers, said flat sealing member being in fact a hollow membrane provided with an inlet connection for refrigerant and lubricant to feed in, a number of outlet holes for said refrigerant and said lubricant to deliver from said hollow interior space to the zone of contact with the roller end faces, and a number of holes for said lubricant and said refrigerant to withdraw from said zone; said flat sealing member having its contact portion proper shaped as a bowlike projection running from one face of said linear sealer to the other face thereof while rounding the zone of contact of the rollers, said projection featuring a triangular cross section with a sharp crest which provides for a relatively linear contact of the sealing member with the roller end faces.

2. A device as claimed in claim 1, wherein the crest of said projection is rounded off.

3. A device as claimed in claim 1 or 2, wherein a slot opening is provided in the wall of the membrane on at least one side of the projection for a directional feed of the lubricant and refrigerant to the side of the triangular projection.

* * * * *